US00RE37888E

(19) United States
(12) Reissued Patent
Cretu-Petra

(10) Patent Number: US RE37,888 E
(45) Date of Reissued Patent: Oct. 22, 2002

(54) WATER FAUCET WITH TOUCHLESS CONTROLS

(76) Inventor: Eugen Cretu-Petra, 28356 Seneca, Flat Rock, MI (US) 48134

(21) Appl. No.: 09/515,929

(22) Filed: Feb. 29, 2000

Related U.S. Patent Documents

Reissue of:
(64) Patent No.: 5,868,311
Issued: Feb. 9, 1999
Appl. No.: 08/922,843
Filed: Sep. 3, 1997

U.S. Applications:
(63) Continuation-in-part of application No. 08/611,776, filed on Mar. 6, 1996, now abandoned.

(51) Int. Cl.[7] ..... G05D 23/13
(52) U.S. Cl. ..... 236/12.12; 4/623; 251/129.04
(58) Field of Search ..... 236/12.12; 4/623; 251/129.04

(56) References Cited

U.S. PATENT DOCUMENTS

| | | | | |
|---|---|---|---|---|
| 4,563,780 A | | 1/1986 | Pollack | |
| 4,651,777 A | | 3/1987 | Hardman | |
| 4,735,357 A | * | 4/1988 | Gregory | 4/623 |
| 4,756,030 A | | 7/1988 | Juliver | 4/192 |
| 4,762,273 A | | 8/1988 | Gregory et al. | |
| 4,909,435 A | | 3/1990 | Kidouchi et al. | |
| 4,923,116 A | | 5/1990 | Homan | |
| 4,931,938 A | | 6/1990 | Hass | 364/152 |
| 4,941,608 A | | 7/1990 | Shimizu et al. | |
| 4,945,943 A | | 8/1990 | Cogger | 137/360 |
| 5,025,516 A | * | 6/1991 | Wilson | 4/623 |
| 5,032,992 A | | 7/1991 | Bergmann | 364/550 |
| 5,062,164 A | | 11/1991 | Lee et al. | |
| 5,074,520 A | * | 12/1991 | Lee et al. | 251/129.04 |
| 5,092,560 A | | 3/1992 | Chen | 251/30.03 |
| 5,095,941 A | | 3/1992 | Betz | 137/552 |
| 5,095,945 A | * | 3/1992 | Jensen | 251/129.04 |
| 5,125,433 A | | 6/1992 | DeMoss | 137/607 |
| 5,184,642 A | | 2/1993 | Powell | 137/607 |
| 5,243,717 A | * | 9/1993 | Yasuo | 251/129.04 |
| 5,309,940 A | | 5/1994 | Delabie | 137/607 |
| 5,397,099 A | | 3/1995 | Pillolla | 251/129.03 |
| RE35,018 E | | 8/1995 | Homan | 236/12.12 |
| 5,458,147 A | | 10/1995 | Mauerhofer | 137/1 |
| 5,504,950 A | * | 4/1996 | Natalizia et al. | 4/623 |
| 5,577,660 A | * | 11/1996 | Hansen | 251/129.04 |
| 5,586,746 A | * | 12/1996 | Humpert et al. | 251/129.04 |
| 5,755,262 A | * | 5/1998 | Pilolla | 251/129.04 |
| 5,771,923 A | * | 6/1998 | Peterson et al. | 251/129.04 |
| 5,855,356 A | * | 1/1999 | Fait | 4/623 |

FOREIGN PATENT DOCUMENTS

| | | |
|---|---|---|
| DE | 0 332 045 | 2/1989 |

* cited by examiner

*Primary Examiner*—William E. Tapolcai

(57) ABSTRACT

A water faucet assembly providing touchless water temperature and water flow adjustment. The assembly comprises a spout, a water mixing valve, at least one proximity sensor, and a microcomputer. The water mixing valve provides a mix and controls the flow of hot water from a hot water supply and cold water from a cold water supply to the spout. The at least one proximity sensor provides a water temperature or water flow input signal having a value corresponding to the distance of an object from the sensor. The microcomputer is responsive to the value of the water temperature input signal to control the water mixing valve and generate a mixture of the hot and cold water corresponding to the distance of the object from the proximity sensor. The microcomputer is also responsive to the value of the water flow input signal to provide a flow of water from the spout corresponding to the distance of the object from the proximity sensor.

23 Claims, 5 Drawing Sheets

WATER FAUCET WITH TOUCHLESS CONTROLS

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a continuation-in-part of U.S. application Ser. No. 08/611,776, filed Mar. 6, 1996, now abandoned.*

TECHNICAL FIELD

This invention relates to a water faucet and, more particularly, to a water faucet with touchless water temperature and water flow adjustment.

BACKGROUND ART

In public facilities, automatic water delivery fixtures are widely used to reduce the spread of germs and water consumption. These fixtures provide touchless on and off control of a stream of water through sensing means. For example, U.S. Pat. No. 5,025,516 issued to Wilson on Jun. 25, 1991 discloses a faucet with sensing means for automatic operation in the form of an emitter and detector mounted on the spout. Some automatic water delivery fixtures provide a stream of water at a predetermined temperature and flow, such as U.S. Pat. No. 5,458,147 issued to Mauerhofer on Oct. 17, 1995. Other automatic water delivery fixtures provide manual controls for the adjustment of water temperature and flow, such as U.S. Pat. No. 5,309,940 issued to Delabie et al. on May 10, 1994.

Although automatic water delivery fixtures have been successfully installed in public facilities, they have several shortcomings which deter household or domestic use. Some locations such as hospitals, nursing homes, and military bases require a faucet to deliver both hot or warm water for hygienic reasons and cold water for consumption purposes. Many homeowners find the delivery of water from a faucet at a predetermined temperature and flow inadequate for their needs. Further, many persons, such as some elderly, the disabled, and the handicapped, are unable to operate a water faucet with manual controls. Many automatic water delivery fixtures cannot protect against flooding, scalding, and/or cold shock. Furthermore, many automatic water delivery fixtures cannot maintain a set water temperature as the hot water supply is depleted. Accordingly, there is a need for a water faucet which can be fully and conveniently operated through touchless adjustments.

SUMMARY OF THE INVENTION

An object of the present invention is to provide a water faucet with touchless water temperature adjustment.

Another object of the present invention is to provide a water faucet with touchless water flow adjustment.

In carrying out the above objects, and other objects and features of the present invention, a water faucet assembly with touchless controls is provided. The water faucet assembly comprises a spout, a water mixing valve, at least one proximity sensor, and a microcomputer. The water mixing valve provides a mix and controls the flow of hot water from a hot water supply and cold water from a cold water supply to the spout. The at least one proximity sensor provides a water temperature and/or water flow input signal having a value corresponding to the distance of an object from the sensor. The microcomputer is responsive to the value of the water temperature input signal to control the water mixing valve and generate a mixture of the hot and cold water corresponding to the distance of the object from the proximity sensor. The microcomputer is also responsive to the value of the water flow input signal to provide a flow of water from the spout corresponding to the distance of the object from the proximity sensor.

In a more specific embodiment, the faucet assembly as described may include a temperature sensor responsive to the temperature of the water leaving the water mixing valve for providing water temperature data and wherein the microcomputer is responsive to the water temperature data to control the water mixing valve and generate a mixture of the hot and cold water corresponding to the distance of the object from the proximity sensor.

In another more specific embodiment, the faucet assembly as described may include a display controlled by the microcomputer for providing operational status information in a visual form.

In another more specific embodiment, the faucet assembly as described may include a speaker controlled by the microcomputer for providing operational status information in a verbal form.

In another more specific embodiment, the faucet assembly as described may include flood detection means generating a flood signal to prevent an overflow of water from a basis and wherein the microcomputer controls the water mixing valve based upon the flood signal provided by the flood detection means.

In another more specific embodiment, the faucet assembly as described may include a microphone responsive to verbal instructions to actuate the microcomputer to execute the verbal instructions.

In another more specific embodiment, the faucet assembly as described may include an instant tankless water heater controlled by the microcomputer to provide hot water.

In another more specific embodiment, the faucet assembly as described may include a touchless liquid dispenser controlled by the microcomputer to dispense a liquid such as a soap or shampoo.

An advantage of the present invention is that it provides a touchless water faucet adapted for domestic use.

Another advantage of the present invention is that it provides a water faucet which can be operated by elderly, disabled, and handicapped people.

Yet another advantage of the present invention is that it provides a water faucet which can detect and prevent a flood condition.

Still another advantage of the present invention is that it provides a water faucet which can maintain a set water temperature as the hot water supply is depleted.

The above objects and other objects, features, and advantages of the present invention will be readily apparent from the following detailed description of the best mode for carrying out the invention when taken in conjunction with the accompanying drawings.

BEST MODE FOR CARRYING OUT THE PRESENT INVENTION

Figure 1:
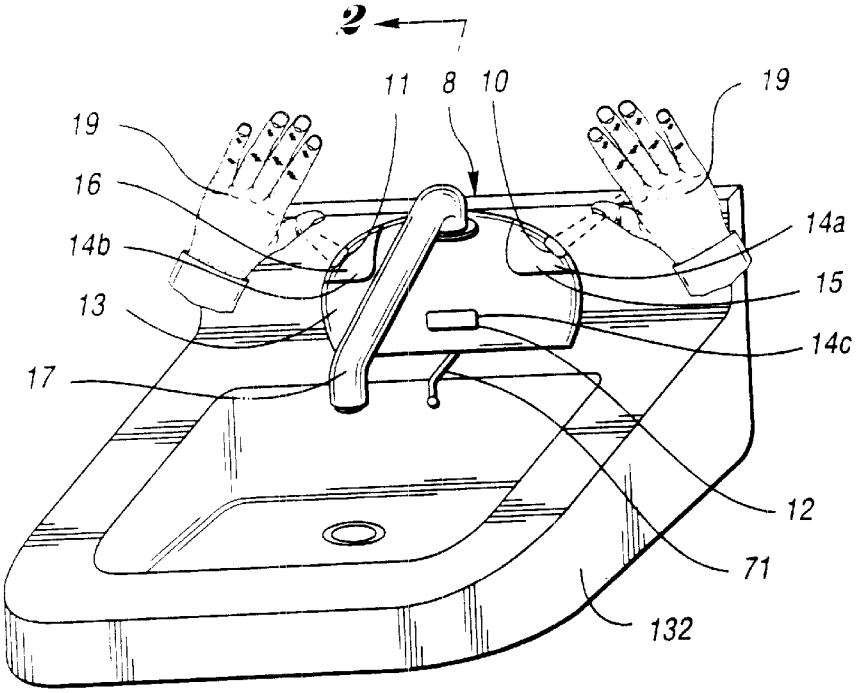
FIG. 1 is an perspective view of a water faucet assembly with touchless water temperature and water flow adjustment according to the present invention.

FIG. 1 shows a water faucet assembly 8 according to the present invention attached to a basin or sink 132. The faucet assembly 8 includes a spout 17 projecting from a housing or body 13. Housing 13 can be made of any ceramic, plastic, or metal material. Preferably, the housing surface is smooth so that it may be easily cleaned. Housing 13 includes three lenses 14a, 14b, and 14c which are sealed to prevent moisture incursion. Preferably, lens 14a, 14b, and 14c are made of transparent plastic or glass. Located directly behind lenses 14a and 14b are displays 15 and 16 respectively. Preferably, displays 15 and 16 are positioned such that they may be easily seen by a user standing in front of assembly 8.

Three proximity sensors 10, 11, and 12 are mounted behind lenses 14a, 14b, and 14c respectively. Sensor 12 provides on and off control of a stream of water from spout 17. Sensors 10 and 11 control water temperature and water flow. Sensors 10, 11, and 12 are used to detect the presence of an object and, further, to determine the distance of the object from the sensor. Preferably, sensors 10 and 11 are positioned such that they may be easily and comfortably activated by a user's hand. Sensor 12 should be positioned such that the presence of the user's hand underneath the spout 17 activates the sensor 12. Preferably, sensor 12 may be positioned at the base of housing 13 as shown in FIG. 1 or mounted underneath spout 17. Mounting sensor 12 underneath spout 17 is especially advantageous if spout 17 is designed to pivot about housing 13.

Figure 2:
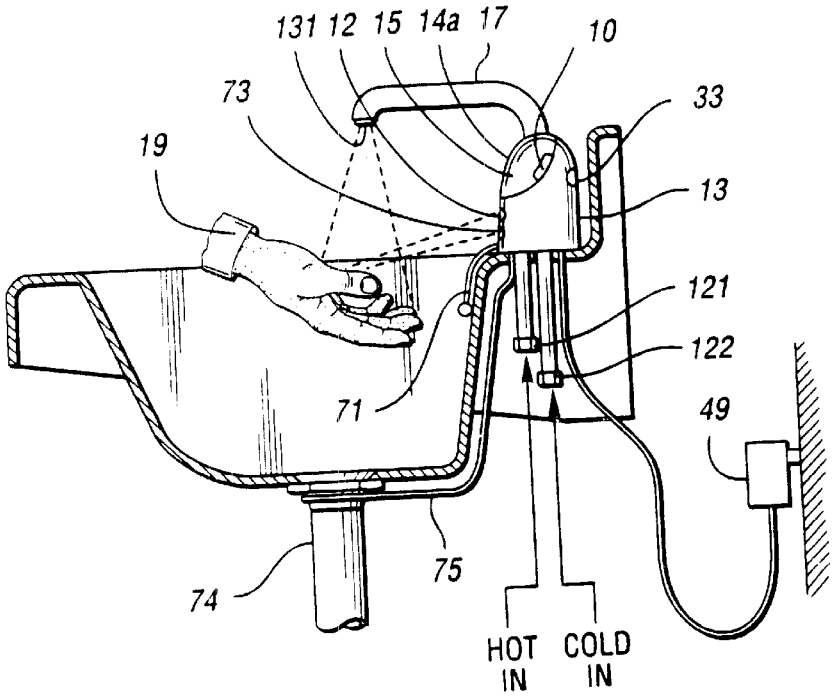
FIG. 2 is a cross-sectional view of the water faucet assembly of FIG. 1 taken along line 2—2.

FIG. 2 shows a cross-sectional view of the faucet assembly 8. Two overflow detection electrodes 71 and 75 are electrically connected to assembly 8. Electrode 75 is permanently attached underneath basis 132 to a metallic part of a drain 74. Electrode 71 extends from housing 13 down into basin 132. The length of electrode 71 is adjustable and controlled by a spring-actuated retracting means. Electrode 71 may be pulled from housing 13 to an extended position and, thereafter, retracted back into housing 13 by pressing push button 73. The weight of electrode 71 is such that in the extended position electrode 71 hangs taut against the side of basin 132.

Assembly 8 is electrically connected to a conventional one hundred and twenty volt outlet through an electrical transformer 49. Electrical transformer 49 supplies twelve volts AC of electricity to electronics located within assembly 8, coupled to assembly 8 below basin 132 are a cold water supply pipe 122 and a hot water supply pipe 121. The cold water supply pipe 122 and the hot water supply pipe 121 feed into a water mixing valve 130 shown in FIG. 3.

Optionally, an instant tankless water heater 92 (described below with reference to FIG. 4) may be connected in series with hot water supply pipe 121. The tankless water heater 92 may be used to heat water when the temperature of water from a conventional hot water tank decreases due to tank depletion. Additionally, heater 92 may be used in place of a conventional hot water tank. To operate in this manner, the inlet of heater 92 receives water from the cold water supply pipe 122 and the outlet of heater 92 supplies water to the hot water supply pipe 121.

Figure 3:
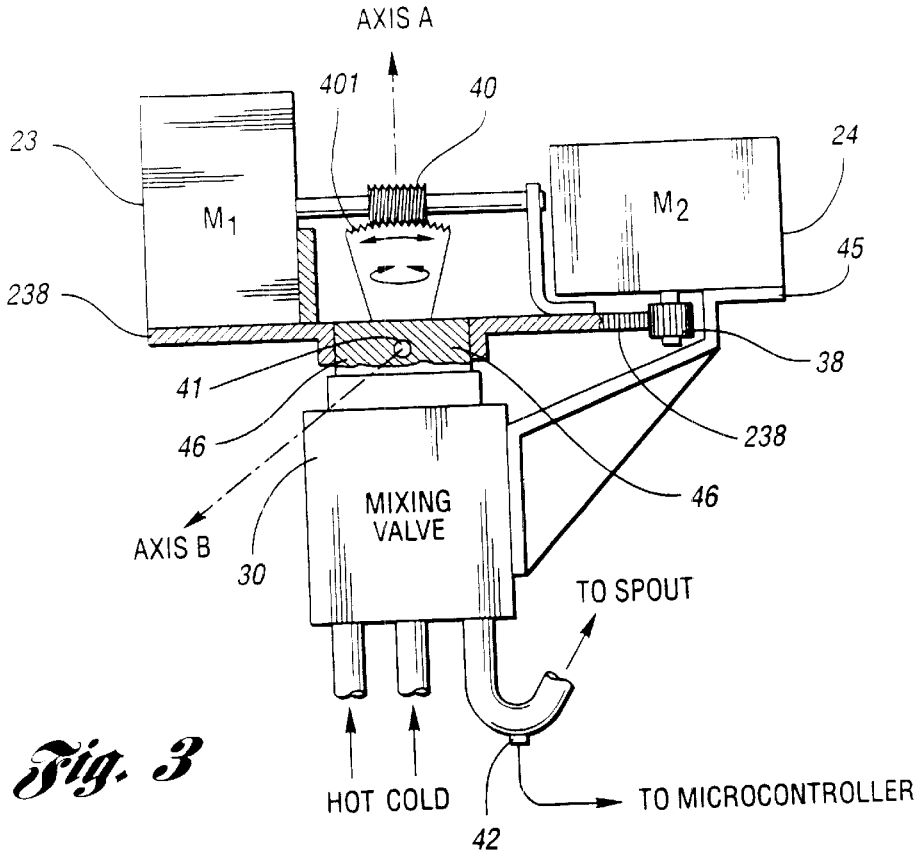
FIG. 3 is an elevational view of a water mixing valve and associated hardware within the water faucet assembly.

FIG. 3 shows an elevational view of the water mixing valve 30. The design of mixing valve 30 is adapted to be operated by a conventional single handle faucet. Two ceramic disc input valves are located within the mixing valve 30. These two input valves regulate the temperature and flow of water exiting mixing valve 30. A control piece 401 may be rotated about two different axes, axis A and axis B, to control the movement of the two input valves. The flow of water exiting mixing valve 30 is regulated by rotating control piece 401 about axis B. The temperature of water exiting mixture valve 30 is regulated by rotating the control piece about axis A. A first motor 23 drives a screw 40 to rotate control piece 401 about axis B. First motor 23 is fixed to a first gear wheel 238. A second motor 24 drives a second gear wheel 38 which rotates the first gear wheel 238 and control piece 401 about axis A. A support 45 permanently fixes second motor 24 with respect to mixing valve 30. Preferably, first motor 23 and second motor 24 are stepper motors. Mixed water exiting the mixing valve 30 flows pass a water temperature sensor 42 to spout 17.

Figure 4:
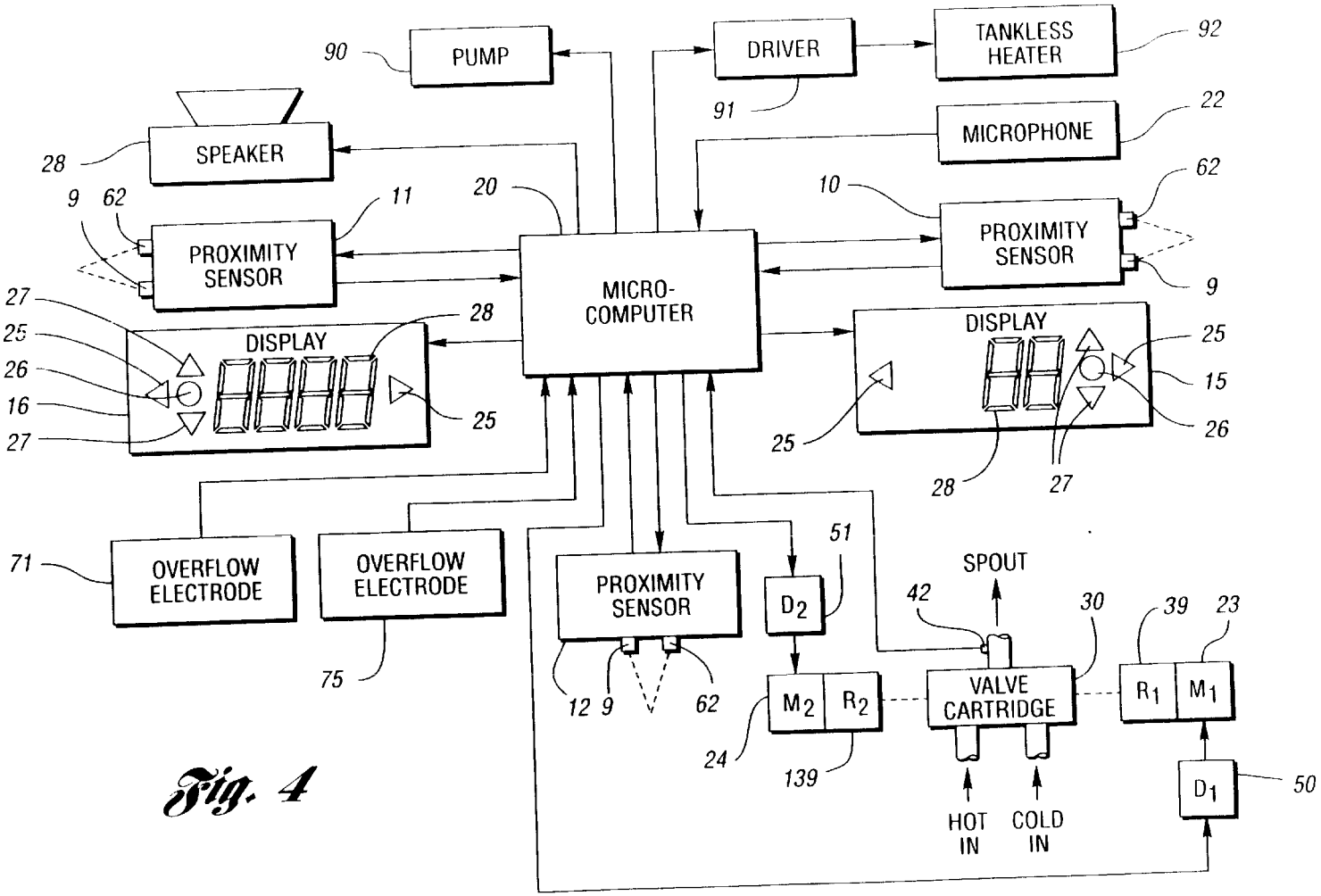
FIG. 4 is an electrical block diagram of the water faucet assembly.

FIG. 4 shows an electrical block diagram of the water faucet assembly 8. Assembly 8 is operated through a microcontroller 20. Outputs of assembly 8 are controlled by the microcontroller 20 based on data provided by several inputs. Microcontroller 20 controls a speaker 28, a pump 90, the tankless heater 92, the two motors 23 and 24, and the two displays 15 and 16. Further, microcontroller 20 receives input data from a microphone 22, the water temperature sensor 42, the two overflow detection electrodes 71 and 75, and the three proximity sensor 10, 11, and 12.

Microcontroller 20 is an integrated circuit chip providing a microprocessor, programmable memory (PROM), erasable memory (RAM), analog to digital converting means and other logic operations. In a preferred embodiment, microcontroller 20 is a Motorola M68HC11 chip.

Microcontroller 20 receives input data from water temperature sensor 42. As shown in FIG. 3, water temperature sensor 42 is positioned within assembly 8 so as to provide data regarding the temperature of the water delivered from spout 17. Water temperature sensor 42 is a diode or a thermistor. Water temperature sensor 42 has two terminals and is placed in the stream of water exiting from the water mixing valve 30. Water temperature sensor 42 provides an output voltage corresponding to the water temperature to microcontroller 20. Using the output voltage and a look-up table stored in memory, microcontroller 20 can determine the actual temperature of the water flowing past temperature sensor 42.

Microcontroller 20 also receives input data from overflow detection electrodes 71 and 75. Electrodes 71 and 75 are used to fill basin 132 to a predetermined water level and, further, to prevent an overflow of water from the basin 132. The height of adjustable electrode 71 within basin 132 sets the predetermined water level. When the water level in basin 132 rises to electrode 71, an electrical path between electrodes 75, which is attached to a metallic part of drain 74, and electrode 71 is completed. The water in basin 132 acts as a conductive means so that a continuity signal may be transmitted from one electrode to the other. Microcontroller 20 is programmed to prohibit additional water flow from spout 17 by adjusting the input valves of the water mixing valve 30 to a closed position when the overflow protection circuit is completed.

Figure 5:
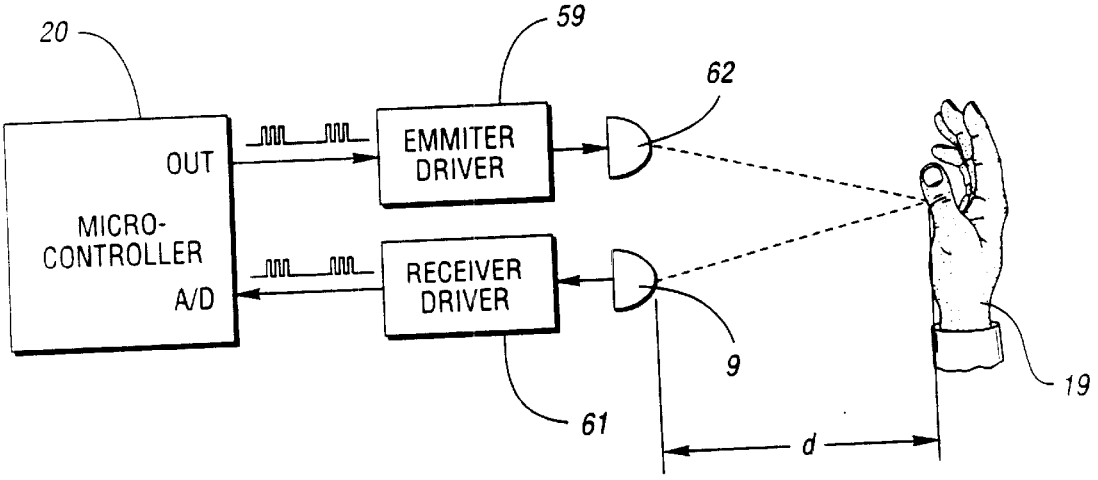
FIG. 5 is an electrical block diagram of a proximity sensor.

Microcontroller 20 further receives input data from proximity sensors 10, 11, and 12. Proximity sensors 10, 11, and 12 are of the same construction. FIG. 5 shows an electrical block diagram of a proximity sensor. Each sensor 10, 11, and 12 is comprised of an emitter driver 59, an infrared light emitter 62, a phototransistor 9, and a receiver circuit 61 enclosed in a grounded sensor housing.

Microcontroller 20 is programmed to generate and deliver a signal having one or more electrical pulses to emitter driver 59. The electrical pulses generated by microcontroller 20 are transformed by emitter driver 59 and emitter 62 into pulses of infrared light. To reduce the amount of time emitter 62 is operating and conserve energy, each electrical pulse is preferably of a short duration. The pulses of infrared light from emitter 62 are optically focused to a distant point by a lens.

Phototransistor 9 is located adjacent emitter 62 to receive reflected pulses of infrared light. Phototransistor 9 and receiver circuit 61 transform the reflected pulses of infrared light into an electrical signal to be analyzed by microcontroller 20. If the number of pulses received by phototransistor 9 equal the number of pulses emitted by emitter 62, then microcontroller 20 will further analyze the amplitude of the reflected pulses. Different amplitudes of the reflected pulses correspond to different distances between a reflecting object and emitter 62.

Microcontroller 20 is programmed to process this distance calculation as an input request from a user. With regard to a proximity sensor for controlling water temperature, microcontroller 20 may be programmed to recognize a large distance as a request for hot water and a smaller distance as a request for cooler or colder water or vice versa. With regard to a proximity sensor for controlling water flow, microcontroller 20 may be programmed to recognize a large distance as a request for a high flow and a smaller distance as a request for a lower flow or vice versa. Microcontroller 20 is programmed to ignore pulses resulting from reflections from non-moving objects near assembly 8 such as walls, mirrors, etc.

Figure 6:
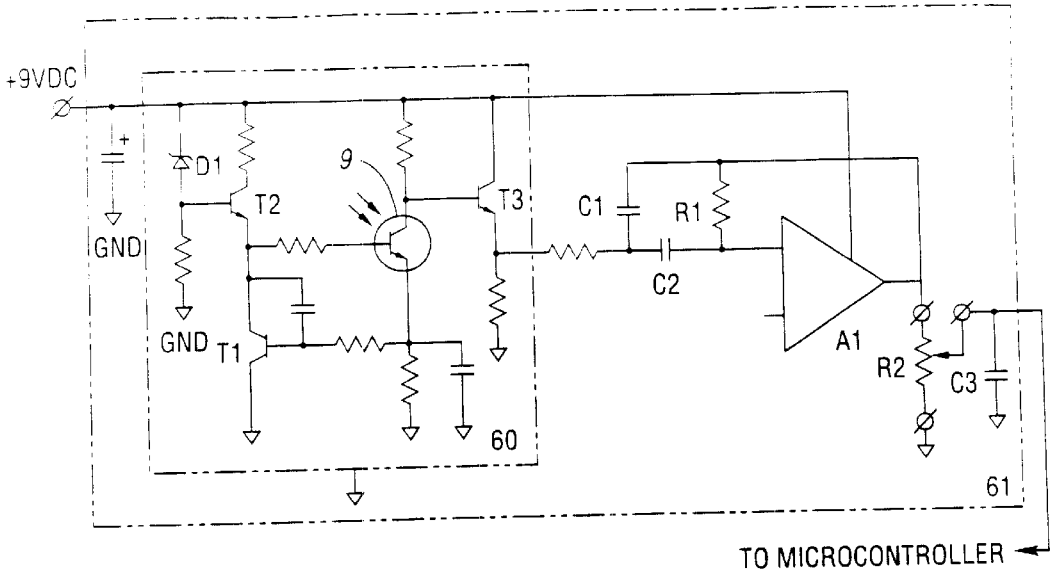
FIG. 6 is an electrical schematic a phototransistor circuit and a receiver circuit.

FIG. 6 shows an electrical schematic of a phototransistor circuit 60 and the receiver circuit 61. To maintain a constant amplifying factor in different lighting and temperature conditions, phototransistor circuit 60 includes transistors T1, T2, and T3 and diode D1. Receiver circuit 61 includes phototransistor circuit 60, capacitors C1, C2, and C3 resistors R1 and R2, and an operational amplifier A1. The output of phototransistor circuit 60 is amplified by operational amplifier A1. Resistor R2 is a variable resistor used to adjust the sensitivity of receiver circuit 61. The middle pin of variable resistor R2 is connected to an analog to digital converter within microcontroller 20.

Motors 23 and 24 are controlled by microcontroller 20 through motor drivers 50 and 51 respectively. Motors 23 and 24 with gear reducers 39 and 139 respectively rotate control piece 401 and thereby control the water temperature and water flow exiting the mixing valve. Microcontroller 20 is programmed to operate motors 23 and 24 based upon input data received from proximity sensors 10, 11, and 12.

Figure 7:
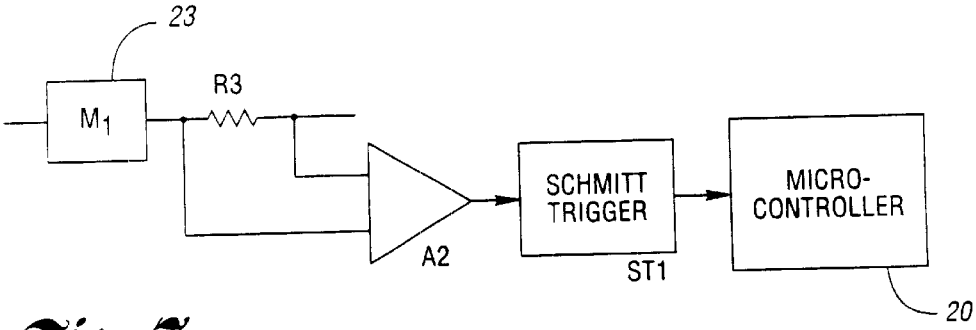
FIG. 7 is an electrical schematic of a current detection circuit.

After a first connection or reconnection of the power supply, assembly 8 must be reset as the microcontroller 20 is programmed. This reset requires a current detector. Two current detection circuits monitor the operation of motors 23 and 24. FIG. 7 shows an electrical schematic of a current detection circuit. The current detection circuit provides a trigger signal to microcontroller 20 when the input valve controlled by motor 23 has reached the end of its course.

The current detection circuit includes a resistor R3, an operational amplifier A2, and a Schmitt Trigger ST1 having an adjustable trigger level. Resistor R3 is coupled in series with motor 23. Operational amplifier A2 amplifies the voltage across resistor R3 and inputs the amplified voltage to Schmitt Trigger ST1. When the input voltage to Schmitt Trigger ST1 rises above the predetermined trigger level, a trigger signal is transmitted to microcontroller 20. In operation, as motor 23 moves its respective input valve near the end of its course, the current through motor 23 and resistor R3 increases, the voltage across R3 increases, and a trigger signal is transmitted to microcontroller 20.

Microcontroller 20 knows which direction the input valve was moving and therefore, can identify which end of course the input valve has reached. Every time assembly 8 is operated or motor 23 or 24 moves to the end of its course, microcontroller 20 is reset.

Referring to FIG. 4, microcontroller 20 also controls displays 15 and 16, which include several seven-segment digit displays 28 and light emitting diode (LED) indicators. Display 16 includes four digit displays 28 and display 15 includes two digit displays 28. Displays 15 and 16 present water temperature and water flow information on the four digit and two digit displays when assembly 8 is in operation. Additionally, displays 15 and 16 include a string of LEDs which form a bar display. The bar displays present water temperature and water flow information.

Display 16 presents the time of day on its four digit display when assembly 8 is in a stand-by mode. Display 15 presents the date of the month on its two digit display when assembly 8 is in a stand-by mode. Time and date information is supplied from microcontroller 20.

LED indicators on each display present information regarding the assembly's mode of operation 25, activation of proximity sensors 26 and direction of temperature or flow adjustment 27.

Microcontroller 20 is programmed to process a distance activation signal from a proximity sensor as an input request from the user. As discussed earlier, microcontroller 20 may be programmed to recognize this request as a water temperature or water flow input.

Microcontroller 20 is also programmed to control driver 91 of tankless instant heater 92. Tankless heater 92 may be used to heat water in hot water supply pipe 121, such as when the assembly has been idle for a long period of time or when the hot water supply of a conventional hot water tank is depleted. Finally, microcontroller 20 is also programmed to control micromotorized pump 90 so as to dispense a predetermined quantity of liquid soap, for a sink or basin, or shampoo, for a tub faucet.

Control of the flow of the water, by turning the water on and off, is accomplished by opening and closing the flow valve at predetermined values of temperature and flow of water.

Sensor 12 has the same construction as sensors 10 and 11. The difference between the sensor 12 and sensor 10 or 11 is the way microcontroller 20 interprets the output from the receiver circuit 61 of sensor 12. As shown in FIG. 5, phototransistor 9 receives reflected infrared pulses of light emitted from emitter 62. The signal amplified by receiver 61 is sent to an analog to digital converter within microcontroller 20. When a moving object enters the activation area of sensor 12 the amplitude of reflected pulses varies. Microcontroller 20, by its program, interprets this variation as an activation of sensor 12. When microcontroller 20 does not detect a moving object it considers the sensor deactivated and, after few seconds, stops further water delivery. This sensing method is advantageous because activation requires a moving object, such a the user's hands or objects manipulated by user. When water delivery is activated by sensor 10 or 11, the activation status of sensor 12 is irrelevant to microcontroller 20. Additionally, a short activation of sensor 12, achieved by moving an object in the activation area of the sensor, will initiate water delivery for up to ten minutes if a second short activation over sensor 12 is not detected. Water delivery can be stopped at anytime, despite how delivery may have been activated, by making a move over sensor 10, 11, or 12.

A short activation over sensor 10 or 11 causes microcontroller 20 to activate micromotorized pump 90 for a predetermined time to dispense a predetermined quantity of liquid soap or shampoo for a sink, basin, or tub faucet.

On and off control of water delivery may be accomplished via voice activation or verbal instruction. Verbal orders may be prerecorded by a user through the proximity sensors during the menu operations. For example: "faucet open" and "faucet off" for water delivery on and off, "faucet cold" for cold water delivery, "faucet program three" for the third preset program, "faucet temperature up" for an increase in water temperature, "faucet temperature down" for a decrease in water temperature, and "faucet temperature 95 degrees Fahrenheit" for water at a temperature of 95 degrees. The first word, in this example "faucet", is a password or key to operate the assembly 8. The user must prerecord the password and may change the password later. Manufacturers such as Speech Systems, Inc. of Boulder, Colo. or Sensory Corporation of Sunnyvale, Calif. produce microchips and software to perform such voice recognition. These microchips can "understand" numbers, basic words (e.g. "yes" and "no"), and prerecorded words from any user. To operate properly, a voice recognition microchip must be connected to microphone 22.

When sensor 10, 11, or 12 is activated or water is delivered, displays 15 and 16 present information regarding the water temperature and water flow. When sensor 10 is activated, indicator 26 of display 15 is activated. When sensor 11 is activated, indicator 26 of display 16 is activated. After a few seconds of nonuse, assembly 8 automatically reverts to a stand-by mode, switching off the water temperature and water flow information and presenting the time of day and date. Both displays 15 and 16 include stand-by indicators 25.

The adjustment of water temperature is accomplished by motor 24, gear wheels 38 and 238, a valve piece 46, and the ceramic disc input valves by opening and closing at the same time the cold and hot water supply. This is a differential way of adjusting water temperature, meaning as hot water is increased, cold water is decreased and vice versa. While sensor 10 or 11 is activated the flow or temperature reading presented on display 15 or 16 shows the value of the water flow or temperature selected by the user digitally and by way of the display bar comprised of LEDS. The longer the bar, the higher the water temperature and flow. The shorter the bar, the lower the water temperature and flow.

The adjustment system described above, depends on the distance of activation. Display 16 shows the desired water temperature selected by the user and recorded in the memory of microcontroller 20. To enable microcontroller 20 to instantly memorize a desired set temperature or flow, the user must hold their band still in front of sensor 10 and/or 11 at the appropriate distance for at least one-half second. The user then has up to three seconds to remove their hand. When adjustments are completed, water can be delivered as described above. Next, microcontroller 20 begins adjusting the input valves, through motor 24, to obtain and maintain the temperature presented on display 16. Microcontroller 20 compares the selected water temperature presented on display 16 with the actual water temperature supplied by temperature sensor 42. If there is a difference, microcontroller 20 adjusts the input valve via motor 24 by rotating the valve through a number of steps. The number of steps is predetermined and in accordance with difference in temperature as is written in the microcontroller program.

Flow adjustment is accomplished through motor 23, a screw 40, control piece 401, and mixing valve 30. Water flow information is presented on display 15. Seven represents the maximum flow and zero represents no flow.

Protection against flood is accomplished in three ways through a timer, the overflow detection circuit, and sensor 12. First, microcontroller 20 is programmed to prohibit additional water delivery after a predetermined time limit when the assembly 8 has been activated through sensor 10, 11, or 12. This time limit or timer can be preset by the user through menu operations via proximity sensors up to a maximum of about 10 minutes. This timer also prevents against the waste of water. Second, as discussed above, any time a basin full of water completes the overflow detection circuit further water flow is prohibited by mixing valve 30 and motor 23. Finally, to prevent false activation and flooding, microcontroller 20 recognizes an activation from sensor 12 only by way of a moving object. This is accomplished in two ways. First, water is delivered as long as the user's hand is positioned over sensor 12. Second, after a move is made over sensor 12, water is delivered until the preset time limit has expired or until an additional move over sensor 12 is made. False activation of a sensor is further prevented by microcontroller 20 through the use of a preset sensitivity limit. Microcontroller 20 will consider a sensor activated only if the change in the voltage signal from the sensor is greater than the preset sensitivity limit. Typically, the preset sensitivity limit is set to 1 volt.

Assembly 8 also protects against scalding. During normal use of the faucet, water cannot exceed the scalding temperature limit set by the user or by the manufacturer in the memory of the microcontroller 20. However, the faucet is capable of delivering water at the host water supply pipe temperature by preset program. This preset program is available only to a user with password access.

Cold shock and any temperature shock is avoided by way of automatic temperature control. Any disturbance in water temperature is eliminated quickly before it can be felt by the user with very small thermal, mechanical, and electrical inertia of the system. This feature is appreciated especially by children in the kitchen or bathroom or a user in a shower.

Optionally, assembly 8 may use a tankless water heater 92 to maintain a desired set temperature as the hot water supply from a conventional hot water tank is depleted. Tankless water heater 92 is controlled by driver 91. Driver 91 is controlled by microcontroller 20. When assembly 8 is idle for more than ten minutes, the temperature of the water in hot water supply pipe 121 decreases. When a user initiates the faucet desiring warm water, assembly 8 will simultaneously open the hot water supply and close the cold water supply via mixing valve 30. If the water temperature sensed by temperature sensor 42 is below the water temperature desired by the user, microcontroller 20 will initiate water heater 92 in order to more quickly reach the desired set water temperature. Furthermore, microcontroller 20 also initiates the water heater 92 when the conventional hot water tank can not supply water hot enough to reach the desired water temperature. Although heater 92 is the most economical way to heat water.

Assembly 8 consumes less than 0.5 watts per hour. A small battery being charged all the time provides enough energy to operate the assembly 8 for a day or more.

Assembly 8 can speak and beep. A beep, in a different tone, is provided every time any change presented on display 15 or 16 is done. To aid first time users, assembly 8 provides a brief explanation of its operation after the first activation of sensor 10, 11 or 12 by way of a speaker 29. During operation, assembly 8 speaks via speaker 29 after each adjustment to acknowledge receipt of the adjustment. For example, "Flow four" means flow is at the fourth level or "temperature eighty two" means the water temperature is 82 degrees Fahrenheit. If hot water is running, assembly 8 says "Sink is overflowed, drain the sink". If a tub is full, assembly 8 says "Your bath is ready". If sensor 10, 11, or 12 is activated more than 10 minutes, it repeatedly says "Flood protection On". All these words are recorded by the manufacturer in the memory of microcontroller 20.

Assembly 8 may receive orders by voice. A microphone 22 transforms received voice sounds into electrical pulses. The analog to digital converter of microcontroller 20, digitizes the electrical pulses. Through its program, microcontroller 20 recognizes orders for on and off control of the water, for access to preset programs, and for water temperature and flow adjustments.

An electronic clock is presented on display 16 when the assembly 8 is operated in the stand-by mode. Clock data is supplied by microcontroller 20.

The above description identified the operation of a three sensor touchless faucet. An alternative embodiment of the present invention is a one sensor touchless faucet.

Figure 8:
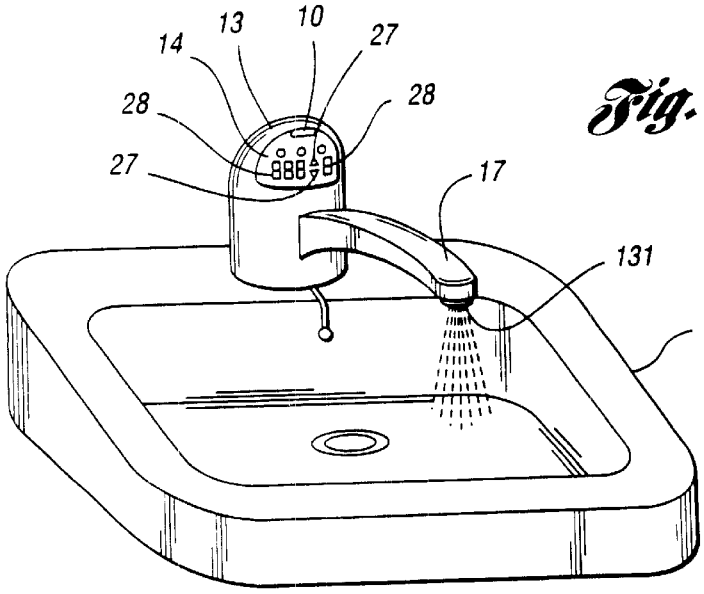
FIG. 8 is a perspective view of a second embodiment of the water faucet assembly.

FIG. 8 shows a one sensor touchless faucet having a proximity sensor 10 including an emitter and a phototransistor. The emitter and phototransistor operate in the same manner as described above. These components are installed in a housing 13 under a lens 14 covering seven segment digit displays 28 and LED indicators 27. The output of sensor 10 is electrically connected to an analog to digital converter within microcontroller 20. Microcontroller 20 controls motors 23 and 24 with motor drivers.

Motors 23 and 24 are mechanically connected to gear reducers 39 and 139 and to mixing valve 30 as shown in FIG. 3. The input valves are connected to cold and hot water supply pipes. Mixing valve 30 outlets to sprout 17. Motors 23 and 24 operate as described above. A water temperature sensor 42 is installed in the outlet of mixing valve 30 and operates as described above. A display presents adjusted water temperature and flow parameters. An overflow detection circuit is connected to microcontroller 20.

The operation of the one sensor touchless faucet differs from the operation of the three sensor touchless faucet in the following ways. Water flow delivery is triggered by activating sensor 10 as described above. Water is delivered at the same temperature and flow as the last adjustment. Adjusting the activation distance "d" between the user's hand and sensor 10, adjusts the water temperature and water flow alternatively. To record or memorize a preset program, the sensor must be activated for 3 seconds or more. Selection of a specific preset flow program may be accomplished by entering the number of the desired program or through voice recognition commands, For example, when the degree symbol is on and a value between fifty and one hundred twenty is presented on display 15, the assembly 8 is ready for a temperature adjustment. A more over sensor 10 starts water delivery. At this time a flow value between zero and ten is presented on display 15. This initial flow can be maintained or adjusted. If sensor 10 is activated for three seconds or more the actual temperature and flow are recorded or memorized in a flow program and a value representing the program is presented on the display. To select a different preset program, an additional move must be made over sensor 10. The number of the actual program or the number of the last program is displayed. To select a different preset program the user may enter the number of the program or provide a voice recognition command.

Another alternative embodiment of the present invention is a two sensor touchless faucet which is an extension of the one sensor touchless faucet. The first sensor operates similar to sensor 10 of the one sensor faucet. The second sensor operates similar to sensor 12 of the three sensor faucet. Sensor 12 is installed on spout 17. Sensor 12 aids in conserving energy and preventing unnecessary waste of water.

Still another alternative embodiment of the present invention is a two sensor touchless faucet which is similar to the three sensor touchless faucet discussed above but without sensor 12. The delivery of water is accomplished by a move over sensor 10. The water will be delivered at the last adjusted temperature and flow. The delivery of water is stopped when an additional move over sensor 10 or 11 is made or the preset time limit has expired.

Figure 9:
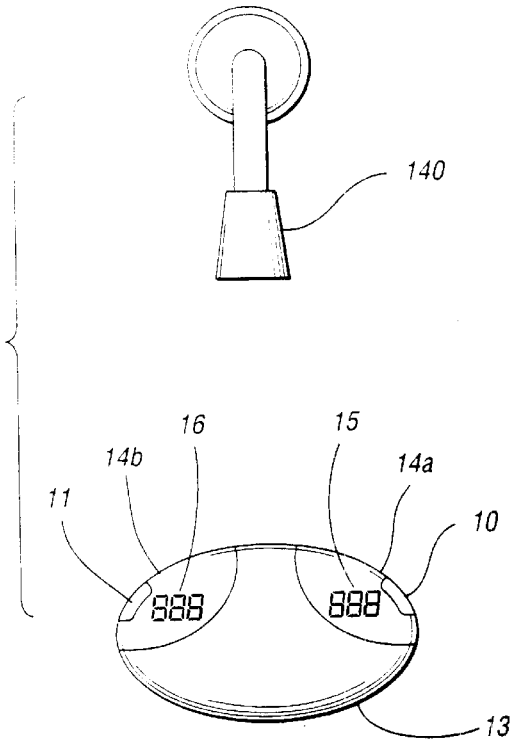
FIGS. 9 and 10 are front and top elevational views, respectively, of a third embodiment of the water faucet assembly for use in a shower.
Figure 10:
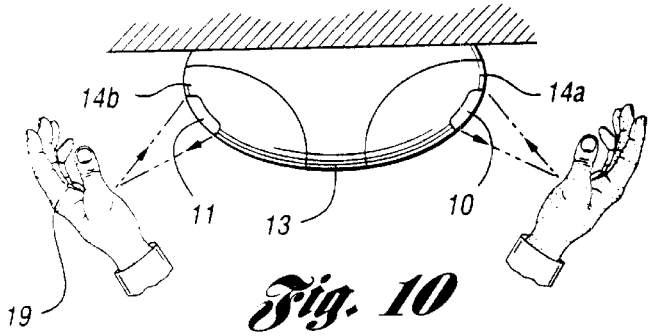
Figure 12:
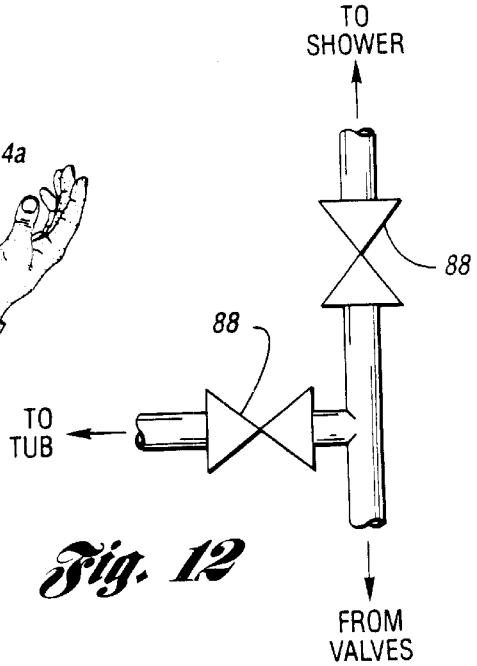
FIG. 12 is a plumbing schematic of the water faucet assembly of FIG. 11.

FIGS. 9 and 10 show a two sensor touchless faucet for a shower. This faucet operates similar to the three sensor faucet described above but without sensor 12. Housing 13 has two lens 14a and 14b. Behind lens 14a and 14b are sensors 10 and 11 and displays 15 and 16, respectively. The motors, valves, and electronics of this faucet are the same as the three sensor faucet.

Figure 11:
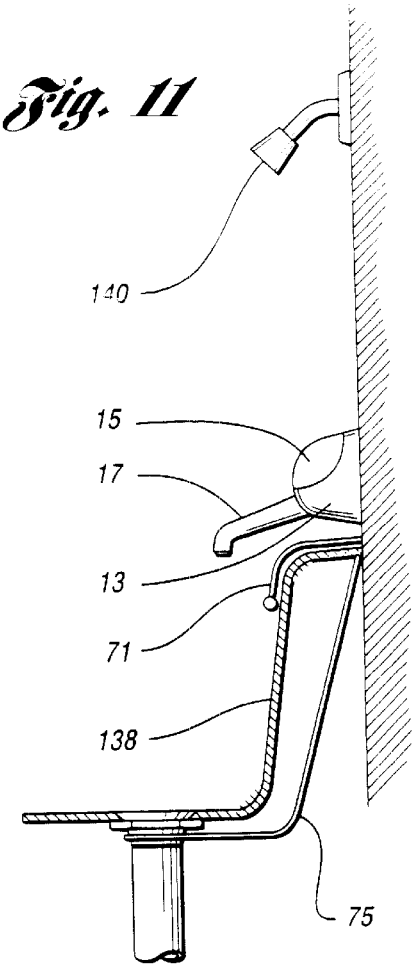
FIG. 11 is a side elevational view of a fourth embodiment of the water faucet assembly for use in a shower and bathtub unit.

FIG. 11 shows an alternative touchless faucet design for a tub 138 and shower 140. The only difference between this design and the two sensor touchless faucet shown in FIG. 9 is that this faucet has a diverter with solenoid valves 88 as shown in 12. Water is diverted to the shower or the tub alternatively, by moving a hand over the flow sensor. This assembly operates similar to the three sensor faucet described above but without sensor 12.

It is to be understood, of course, that while the forms of the invention described above constitute the best mode contemplated of practicing the present invention, the preceding description is not intended to illustrate all possible forms thereof. It is also to be understood that the words used are words of description, rather than of limitation, and that various changes may be made without departing from the spirit and scope of the present invention, which should be construed according to the following claims.

What is claimed is:

1. A water faucet assembly comprising:

a spout;

[a water mixing valve for providing a mix of hot water from a hot water supply and cold water from a cold water supply to the spout;]

*a hot water supply for providing hot water to the spout;*

*a cold water supply for providing cold water to the spout;* at least one proximity sensor for providing a water temperature input signal having a value corresponding to the distance of an object from the sensor; and a microcomputer responsive to the value of the water temperature input signal to control [the water mixing valve] *the hot and cold water supplies* and generate a mixture of the hot and cold water corresponding to the distance of the object from the proximity sensor, thereby providing touchless water temperature adjustment.

2. The assembly of claim 1 including a temperature sensor responsive to the temperature of the water leaving [the water mixing valve] *the spout* for providing water temperature data and wherein the microcomputer is responsive to the water temperature data to control [the water mixing valve] *the hot and cold water supplies* and generate a mixture of the hot and cold water corresponding to the distance of the object from the proximity sensor.

3. The assembly of claim 1 including a display controlled by the microcomputer for providing operational status information in a visual form.

4. The assembly of claim 1 including a speaker controlled by the microcomputer for providing operational status information in a verbal form.

5. The assembly of claim 1 including flood detection means to generate a flood signal preventing an overflow of water from a basin and wherein the microcomputer controls [the water mixing valve] *the hot and cold water supplies* based upon the flood signal provided by the flood detection means.

6. The assembly of claim 1 including a microphone responsive to verbal instructions to actuate the microcomputer to execute the verbal instructions.

7. The assembly of claim 1 including an instant tankless water heater controlled by the microcomputer to provide hot water.

8. The assembly of claim 1 including a touchless liquid dispenser controlled by the microcomputer to dispense a liquid such as a soap or shampoo.

9. A water faucet assembly comprising:

a spout;

[a water mixing valve for controlling a flow of hot water from a hot water supply and cold water from a cold water supply to the spout;]

*a hot water supply for providing hot water to the spout;*

*a cold water supply for providing cold water to the spout;* at least one proximity sensor for providing a water flow input signal having a value corresponding to the distance of an object from the sensor; and a microcomputer responsive to the value of the water flow input signal to provide a flow of water from the spout with the flow of water corresponding to the distance of the object from the proximity sensor, thereby providing touchless water flow adjustment.

10. The assembly of claim 9 including a temperature sensor responsive to the temperature of the water leaving [the water mixing valve] *the spout* for providing water temperature data and wherein the microcomputer is responsive to the water temperature data to control [the water mixing valve] *the hot and cold water supplies* and generate a mixture of the hot and cold water corresponding to the distance of the object from the proximity sensor.

11. The assembly of claim 9 including a display controlled by the microcomputer for providing operational status information in a visual form.

12. The assembly of claim 9 including a speaker controlled by the microcomputer for providing operational status information in a verbal form.

13. The assembly of claim 9 including flood detection means to generate a flood signal preventing an overflow of water from a basin and wherein the microcomputer controls [the water mixing valve] *the hot and cold water supplies* based upon the flood signal provided by the flood detection means.

14. The assembly of claim 9 including a microphone responsive to verbal instructions to actuate the microcomputer to execute the verbal instructions.

15. The assembly of claim 9 including an instant tankless water heater controlled by the microcomputer to provide hot water.

16. The assembly of claim 9 including touchless liquid dispenser controlled by the microcomputer to dispense a liquid such as a soap or shampoo.

17. A water faucet assembly comprising:

a spout;

a water mixing valve for providing a mix of hot water from a hot water supply and cold water from a cold water supply to the spout;

at least one proximity sensor for providing a water temperature input signal having a value corresponding to the distance of an object from the sensor;

a microcomputer to control the water mixing valve;

a temperature sensor responsive to the temperature of the water leaving the water mixing valve for providing water temperature data and wherein the microcomputer is responsive to the water temperature data to control the water mixing valve and generate a mixture of the hot and cold water corresponding to the distance of the object from the proximity sensor, thereby providing touchless water temperature adjustment;

microcomputer is responsive to the water temperature data to control the water mixing valve and generate a mixture of the hot and cold water corresponding to the distance of the object from the proximity sensor, thereby providing touchless water temperature adjustment;

a display controlled by the microcomputer for providing operational status information in a visual form;

a speaker controlled by the microcomputer for providing operational status information in a verbal form;

flood detection means to generate a flood signal preventing an overflow of water from a basin and wherein the microcomputer controls the water mixing valve based upon the flood signal provided by the flood detection means;

a microphone responsive to verbal instructions to actuate the microcomputer to execute the verbal instructions;

an instant tankless water hater controlled by the microcomputer to provide hot water; and a touchless liquid dispenser controlled by the microcomputer to dispense a liquid such as a soap or shampoo.

*18. A water faucet assembly comprising:*

*a spout;*

*a hot water supply for providing hot water to the spout;*

*a cold water supply for providing cold water to the spout;*

*at least one proximity sensor for providing a water temperature input signal having a value corresponding to the distance of an object from the sensor; and*

*a microcomputer responsive to the value of the water temperature input signal to generate a mixture of the hot and cold water corresponding to the distance of the object from the proximity sensor, thereby providing touchless water temperature adjustment.*

*19. The assembly of claim 1 including a temperature sensor responsive to the temperature of the water leaving the spout for providing water temperature data and wherein the microcomputer is responsive to the water temperature data to control the hot and cold water supplies to maintain the water temperature.*

*20. A water faucet assembly comprising:*

*a spout;*

*a water supply for providing water to the spout;*

*at least one proximity sensor for providing a water flow input signal having a value corresponding to the distance of an object from the sensor; and*

*a microcomputer responsive to the value of the water flow input signal to provide a flow of water from the spout with the flow of water having a variable flow rate corresponding to the distance of the object from the proximity sensor, thereby providing touchless water flow adjustment.*

*21. The assembly of claim 9 including a temperature sensor responsive to the temperature of the water leaving the spout for providing water temperature data and wherein the microcomputer is responsive to the water temperature data to control the hot and cold water supplies to maintain the water temperature.*

*22. A water faucet assembly comprising:*

*a spout;*

*at least one proximity sensor for providing a water temperature input signal having a value corresponding to the distance of an object from the sensor; and*

*a microcomputer responsive to the value of the water temperature input signal to generate a mixture of hot and cold water corresponding to the distance of the object from the proximity sensor, thereby providing touchless water temperature adjustment.*

*23. A water faucet assembly comprising:*

*a spout;*

*at least one proximity sensor for providing a water flow input signal having a value corresponding to the distance of an object from the sensor; and*

*a microcomputer responsive to the value of the water flow input signal to provide a flow of water from the spout with the flow of water having a variable flow rate corresponding to the distance of the object from the proximity sensor, thereby providing touchless water flow adjustment.*

* * * * *